United States Patent
Masuda et al.

(10) Patent No.: US 11,874,019 B2
(45) Date of Patent: Jan. 16, 2024

(54) DEHUMIDIFYING DEVICE FOR DEW POINT TEMPERATURE ADJUSTMENT

(71) Applicant: NIHON SPINDLE MANUFACTURING CO., LTD., Hyogo (JP)

(72) Inventors: Katsuhiro Masuda, Hyogo (JP); Akira Ueda, Hyogo (JP); Masafumi Yamaguchi, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 159 days.

(21) Appl. No.: 17/407,821

(22) Filed: Aug. 20, 2021

(65) Prior Publication Data

US 2021/0381701 A1 Dec. 9, 2021

Related U.S. Application Data

(63) Continuation of application No. PCT/JP2020/007546, filed on Feb. 25, 2020.

(30) Foreign Application Priority Data

Mar. 29, 2019 (JP) ................................. 2019-069460

(51) Int. Cl.
*F24F 3/14* (2006.01)
*F24F 11/74* (2018.01)
(Continued)

(52) U.S. Cl.
CPC ............ *F24F 3/1423* (2013.01); *F24F 11/74* (2018.01); *F24F 11/77* (2018.01);
(Continued)

(58) Field of Classification Search
CPC .................................................... F24F 3/1423
See application file for complete search history.

(56) References Cited

U.S. PATENT DOCUMENTS

| 3,125,157 A | * | 3/1964 | Munters | ................ | F24F 3/1423 |
| | | | | | 165/DIG. 18 |
| 8,328,904 B2 | * | 12/2012 | Griffiths | ................ | F24F 3/1423 |
| | | | | | 96/115 |

(Continued)

FOREIGN PATENT DOCUMENTS

| CN | 104699147 A | 6/2015 |
| JP | H07-000754 A | 1/1995 |

(Continued)

OTHER PUBLICATIONS

International Search Report issued in Application No. PCT/JP2020/007546, dated Jun. 2, 2020.

(Continued)

*Primary Examiner* — Christopher R Zerphey
(74) *Attorney, Agent, or Firm* — Michael Best & Friedrich LLP

(57) ABSTRACT

There is provided a dehumidifying device for dew point temperature adjustment that adjusts a dew point temperature of air to a temperature of about −20° C. or lower, the device including an adjusting unit that adjusts a dew point temperature by adjusting at least one driving operation that is selected from a rotational frequency of a supply fan for supplying air into the dehumidifying device for dew point temperature adjustment, a rotating speed of a dehumidifying rotor, an opening degree of a blow-out air volume adjustment damper, a rotational frequency of an exhaust fan for exhausting air, and an opening degree of an exhaust air volume adjustment damper.

9 Claims, 1 Drawing Sheet

(51) Int. Cl.
    *F24F 11/77*     (2018.01)
    *F24F 140/40*     (2018.01)

(52) U.S. Cl.
    CPC . *F24F 2003/144* (2013.01); *F24F 2003/1458* (2013.01); *F24F 2140/40* (2018.01); *F24F 2203/1032* (2013.01); *F24F 2203/1056* (2013.01); *F24F 2203/1068* (2013.01); *F24F 2203/1088* (2013.01)

(56) References Cited

U.S. PATENT DOCUMENTS

| | | | |
|---|---|---|---|
| 8,580,010 | B2 | 11/2013 | Matsuba et al. |
| 9,777,933 | B2* | 10/2017 | Pahwa .................... F24F 11/00 |
| 10,702,825 | B2* | 7/2020 | Jin ....................... F24F 3/1423 |
| 2019/0022574 | A1* | 1/2019 | Jin ......................... B01D 53/06 |
| 2020/0124299 | A1* | 4/2020 | Sugitani ................. F24F 11/74 |

FOREIGN PATENT DOCUMENTS

| | | |
|---|---|---|
| JP | H10-085546 A | 4/1998 |
| JP | H11-006636 A | 1/1999 |
| JP | H11-188224 A | 7/1999 |
| JP | 2002-320817 A | 11/2002 |
| JP | 2011-190989 A | 9/2011 |
| JP | 2012-117683 A | 6/2012 |
| WO | 2019004122 A1 | 1/2019 |

OTHER PUBLICATIONS

Search Report issued in European Application No. 20782416.0, dated Apr. 19, 2022.

* cited by examiner

DEHUMIDIFYING DEVICE FOR DEW POINT TEMPERATURE ADJUSTMENT

RELATED APPLICATIONS

The contents of Japanese Patent Application No. 2019-069460, and of International Patent Application No. PCT/JP2020/007546, on the basis of each of which priority benefits are claimed in an accompanying application data sheet, are in their entirety incorporated herein by reference.

BACKGROUND

Technical Field

A certain embodiment of the present invention relates to a dehumidifying device for dew point temperature adjustment, which is used in order to reduce moisture in the air (lower a dew point temperature) in a work area for manufacturing precision instruments or precision parts that handle materials disliking hygroscopic moisture.

Description of Related Art

In ultra-precision work, adjustment air having adjusted temperature and humidity is supplied to a divided operation room such as a dry room. For example, the related art discloses, as a temperature and humidity adjusting device for adjusting temperature and humidity, a temperature and humidity adjusting device including a dry type dehumidifier that sucks treatment air and dehumidifies the air to become dry air, a temperature and humidity adjusting mechanism that adjusts the temperature of the dehumidified air, and a blower that sends out the air having adjusted temperature and humidity, these being accommodated in one casing.

SUMMARY

According to an embodiment of the present invention, there is provided a dehumidifying device for dew point temperature adjustment that adjusts a dew point temperature of air to a temperature of about −20° C. or lower, the device including an adjuster portion that adjusts a dew point temperature by adjusting at least one driving operation that is selected from a rotational frequency of a supply fan for supplying air into the dehumidifying device for dew point temperature adjustment, a rotating speed of a dehumidifying rotor, an opening degree of a blow-out air volume adjustment damper, a rotational frequency of an exhaust fan for exhausting air, and an opening degree of an exhaust air volume adjustment damper.

According to another embodiment of the present invention, there is provided a method of using a dehumidifying device for dew point temperature adjustment that adjusts a dew point temperature of air to a temperature of about −20° C. or lower, the method including adjusting at least one driving operation of a rotational frequency of a supply fan for supplying air into the dehumidifying device for dew point temperature adjustment, a rotating speed of a dehumidifying rotor, an opening degree of a blow-out air volume adjustment damper, a rotational frequency of an exhaust fan for exhausting air, and an opening degree of an exhaust air volume adjustment damper.

DETAILED DESCRIPTION

Figure 1:
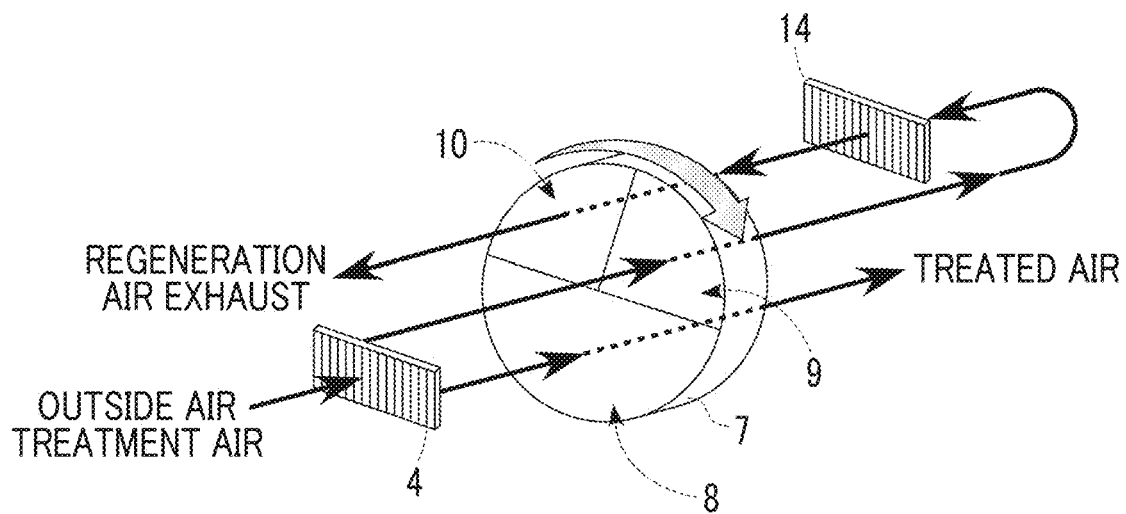
FIG. 1 is a schematic explanatory diagram showing a structure of a dehumidifying rotor.

In an industrial field based on electrical or electronic related technology related to a precision instrument or the like, very low humidity management is required in a work area where a lithium-ion battery, an organic EL display unit, a polarizing film, a semiconductor, or the like is manufactured. Then, it is considered that the lower the dew point temperature in the work area, the better, and a dehumidifying device of the related art is a device only for reducing the humidity in the air.

For example, in the manufacture of the lithium-ion battery, a lithium compound that is a raw material adsorbs the moisture in the air, so that the performance of the manufactured lithium-ion battery is lowered. Therefore, it is necessary to make a dew point temperature a temperature of −30° C. or lower in order to lower the humidity of air in a manufacturing area for the lithium-ion battery.

Further, an organic substance such as an organic light-emitting material or an electrode that is used for an organic EL element of the organic EL display unit is very sensitive to moisture, and the performance or material property thereof is dramatically reduced. Therefore, the humidity of air in a manufacturing area for the organic EL display unit is required to be strictly managed.

As in the dehumidifying device of the related art, in the control aimed only at the lowering of the humidity in the air, dehumidification depends on the performance of the dehumidifying device, and therefore, it is not possible to stably maintain a dew point temperature at an optional dew point temperature in a low dew point of −20° C. or lower.

It is desirable to provide a dehumidifying device for dew point temperature adjustment, in which it is possible to stably adjust a dew point temperature of air to an optional setting value while performing necessary and sufficient dehumidification.

In products that are manufactured in a dehumidified environment, there is a performance difference in product quality even if raw materials are the same. As s cause thereof, a difference in an atmosphere in a manufacturing line was focused. For example, in the manufacture of the lithium-ion battery, it was found that it is necessary to make the dew point temperature in the work area a temperature of −30° C. or lower, while in the case of the dew point temperatures of −80° C. and −30° C., a performance difference occurs in the lithium-ion batteries that are manufactured.

Therefore, from the viewpoint of the quality control of secondary batteries or the like, with respect to air in the work area, a dehumidifying device capable of stably adjusting an appropriate dew point temperature according to the secondary battery or the material or the like thereof was studied diligently. As a result, it was founded that in a dehumidifying device for dew point temperature adjustment, a dew point temperature of air can be stably adjusted to an optional setting value by adjusting at least one driving operation that is selected from a supply fan for supplying air to the inside of the device, a dehumidifying rotor, a blow-out air volume adjustment damper, an exhaust fan for exhausting air, an exhaust air volume adjustment damper, and a regeneration heater, which are functional units of the dehumidifying device, and the present invention has been completed.

That is, the present invention provides the following dehumidifying device for dew point temperature adjustment.

According to the dehumidifying device for dew point temperature adjustment, the frequency of dehumidification treatment per unit volume of air is increased or decreased by adjusting the rotational frequency of the supply fan and the opening degree of the blow-out air volume adjustment damper. Further, the dehumidification treatment efficiency of the dehumidifying rotor is increased or decreased by adjusting the rotating speed of the dehumidifying rotor, the rotational frequency of the exhaust fan, and the opening degree of the exhaust air volume adjustment damper.

That is, according to the dehumidifying device for dew point temperature adjustment, since at least one driving operation of the rotational frequency of the supply fan, the rotating speed of the dehumidifying rotor, the opening degree of the blow-out air volume adjustment damper, the rotational frequency of the exhaust fan, and the opening degree of the exhaust air volume adjustment damper is adjusted by the adjuster portion, it is possible to adjust dehumidification intensity with respect to treatment air. Therefore, according to the dehumidifying device for dew point temperature adjustment, it is possible to adjust the dew point temperature of the treated air that is supplied to the work area. In this way, the effect of being able to stably maintain the dew point temperature in the work area at an optional setting value is exhibited.

In the dehumidifying device for dew point temperature adjustment according to the embodiment of the present invention, the dew point temperature may be adjusted to a temperature in a range of about ±5° C. with respect to a setting value.

According to the dehumidifying device for dew point temperature adjustment, since the dew point temperature of the treated air that is supplied to the work area can be maintained more stably, it is possible to provide a manufacturing area strictly managed in a specific dew point temperature range.

In the dehumidifying device for dew point temperature adjustment according to the embodiment of the present invention, the adjuster portion may be a controller that controls the driving operations.

According to the dehumidifying device for dew point temperature adjustment, since at least one driving operation of the rotational frequency of the supply fan, the rotating speed of the dehumidifying rotor, the opening degree of the blow-out air volume adjustment damper, the rotational frequency of the exhaust fan, and the opening degree of the exhaust air volume adjustment damper can be controlled more accurately, it is possible to stably provide a manufacturing area managed in a specific dew point temperature range.

According to the method of using a dehumidifying device for dew point temperature adjustment, the frequency of dehumidification treatment per unit volume of air is increased or decreased by adjusting the rotational frequency of the supply fan and the opening degree of the blow-out air volume adjustment damper. Further, the dehumidification treatment efficiency of the dehumidifying rotor is increased or decreased by adjusting the rotating speed of the dehumidifying rotor, the rotational frequency of the exhaust fan, and the opening degree of the exhaust air volume adjustment damper.

That is, according to the method of using a dehumidifying device for dew point temperature adjustment, since at least one driving operation of the rotational frequency of the supply fan, the rotating speed of the dehumidifying rotor, the opening degree of the blow-out air volume adjustment damper, the rotational frequency of the exhaust fan, and the opening degree of the exhaust air volume adjustment damper is adjusted, it is possible to adjust the dehumidification intensity with respect to the treatment air. Therefore, according to the method of using a dehumidifying device for dew point temperature adjustment, it is possible to adjust the dew point temperature of the treated air that is supplied to the work area. In this way, the effect of being able to stably maintain the dew point temperature in the work area at an optional setting value is exhibited.

Hereinafter, an embodiment of a dehumidifying device for dew point temperature adjustment according to the present invention will be described in detail with reference to the drawings.

The dehumidifying device for dew point temperature adjustment that is described in the embodiment is merely exemplification for describing the dehumidifying device for dew point temperature adjustment according to the present invention, and there is no limitation thereto.

One Embodiment

In a work area where a secondary battery or the like is manufactured, a dehumidifying device that removes humidity in the air is used. As an industrial dehumidifying device, a desiccant type dehumidifying device is widely used. The basic principle of the desiccant type dehumidifying device is that when treatment air passes through a structure carrying a dehumidifying agent, the dehumidifying agent adsorbs the moisture in the air to provide dry air.

A dehumidifying device for dew point temperature adjustment according to one embodiment of the present invention includes a desiccant type dehumidifying device as a dehumidifying device. As shown in FIG. 1, the desiccant type dehumidifying device has a circular dehumidifying rotor 7 carrying a dehumidifying agent, and the dehumidifying rotor 7 is divided into a treatment zone 8, a precooling zone 9, and a regeneration zone 10. In the treatment zone 8, the dehumidifying agent adsorbs and removes the moisture in the air that is treated. In the regeneration zone 10, the moisture adsorption ability of the dehumidifying rotor 7 is regenerated by dehydrating the moisture adsorbed to the dehumidifying rotor 7 by using the air circulated from the precooling zone 9 and heated by a regeneration heater 14. The dehumidifying rotor 7 rotates, thereby repeating the moisture adsorption and the dehydration in the treatment zone 8 and the regeneration zone 10. In this way, the moisture in the treatment air can be continuously removed.

The desiccant type dehumidifying device can efficiently perform dehumidification even in low-temperature air without depending on the temperature of the treatment air, from a continuous driving operation using the adsorption principle described above, and therefore, a very low dew point temperature can be achieved.

In the dehumidifying device for dew point temperature adjustment according to the present invention, as the dehumidifying device, not only a type in which a dehumidifying agent is rotated by a rotor, but also another type of dehumidifying device may be used. As the other type of dehumidifying device, a type in which a dehumidifying agent is fixed, or the like can be given as an example.

Figure 2:
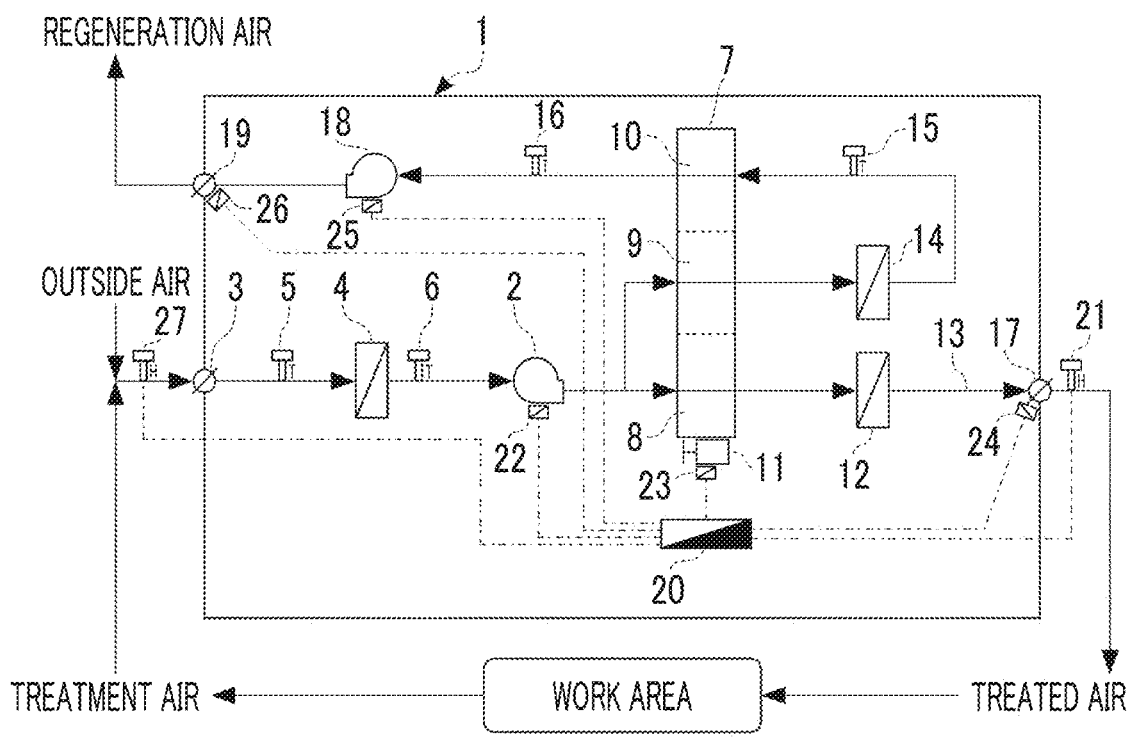
FIG. 2 is a schematic explanatory diagram showing a structure of a dehumidifying device for dew point temperature adjustment according to the present invention and a flow of air.

FIG. 2 is a schematic explanatory diagram showing the structure of the dehumidifying device for dew point temperature adjustment according to one embodiment of the present invention and the flow of air. The solid line arrow in FIG. 2 shows the flow of air through a device part or a pipe.

Further, the straight line of a one-dot chain line in FIG. 2 shows controllable connection.

As shown in FIG. 2, a dehumidifying device for dew point temperature adjustment 1 includes a supply fan 2 (a first functional unit), the dehumidifying rotor 7 (a second functional unit), a blow-out air volume adjustment damper 17 (a third functional unit), an exhaust fan 18 (a fourth functional unit), and an exhaust air volume adjustment damper 19 (a fifth functional unit), which are functional units that adjust a dew point temperature.

Further, the dehumidifying device for dew point temperature adjustment 1 includes a dehumidifying unit such as a dehumidifying agent or the dehumidifying rotor 7, adjuster portions that adjust the first to fifth functional units that adjust the dehumidification performance in the dehumidifying unit, and a controller that controls the adjuster portions. The adjuster portions may be adjuster portions that manually perform the adjustment.

For example, in the case of a dehumidifying device for dew point temperature adjustment capable of lowering a dew point temperature to −80° C., the control of the dew point temperature by the dehumidifying device for dew point temperature adjustment 1 can stably maintain a setting value in a wide dew point temperature range from about −80° C. to −20° C. or lower. The lower limit value of an accuracy error of the dew point temperature with respect to the setting value is preferably −10° C. or higher, more preferably −5° C. or higher, and particularly preferably −2.5° C. or higher. On the other hand, the upper limit value of the accuracy error of the dew point temperature with respect to the setting value is preferably 10° C. or lower, more preferably 5° C. or lower, and particularly preferably 2.5° C. or lower.

Hereinafter, each functional unit will be described.

First Functional Unit

The dehumidifying device for dew point temperature adjustment 1 is provided with the supply fan 2 which is the first functional unit for sucking outside air and treatment air, and a cooling coil 4 is installed between a damper 3, which is a suction unit for the outside air and the treatment air in the dehumidifying device for dew point temperature adjustment 1, and the supply fan 2. Further, a temperature sensor 5 and a temperature sensor 6 are installed before and after the cooling coil 4.

The outside air and the treatment air sucked from the damper 3 by the operation of the supply fan 2 are measured in temperature by the temperature sensor 5 and cooled by the cooling coil 4. In this way, the moisture in the air condenses, and the outside air and the treatment air are dehumidified.

The air dehumidified by the cooling coil 4 is measured in temperature by the temperature sensor 6 and is sent to the dehumidifying rotor 7 by the supply fan 2. It becomes possible to confirm the dehumidification capacity of the cooling coil 4 from the values measured by the temperature sensor 5 and the temperature sensor 6.

The air that is sucked by the damper 3 may be treated with an optional air filter. In this way, dust contained in the outside air and the treatment air can be removed. As the air filter, a coarse dust filter, an ultra-high performance filter (ULPA filter), a chemical filter, or the like can be given as an example.

Next, the function of the supply fan 2, which is the first functional unit, in the dehumidification capacity of the dehumidifying device for dew point temperature adjustment 1 will be described.

In a case where the rotational frequency of the supply fan 2, which is the first functional unit, is increased, the amount of the outside air or the treatment air that is introduced into the dehumidifying device for dew point temperature adjustment 1 increases. At this time, in a case where conditions such as the amount of the treated air that is supplied to the work area, or the amount of the regeneration air that is discharged, and the rotating speed of the dehumidifying rotor 7 are constant, the treatment frequency by the dehumidifying rotor 7 per unit volume of air increases, and thus the amount of the treated air that is supplied to the work area increases. In this way, the dew point temperature in the work area is gently lowered.

On the contrary, in a case where the rotational frequency of the supply fan 2, which is the first functional unit, is reduced, the amount of the outside air or the treatment air that is introduced into the dehumidifying device for dew point temperature adjustment 1 decreases. At this time, in a case where conditions such as the amount of the treated air that is supplied to the work area, or the amount of the regeneration air that is discharged, and the rotating speed of the dehumidifying rotor 7 are constant, the treatment frequency by the dehumidifying rotor 7 per unit volume of air decreases, and thus the amount of the treated air that is supplied to the work area decreases. Therefore, in a case where the rotational frequency of the supply fan 2 is reduced, the treatment frequency decreases, and thus the amount of the treated air that is supplied to the work area decreases, and therefore, the dew point temperature in the work area gently rises.

However, in a case where the amount of the air that is introduced into the dehumidifying device for dew point temperature adjustment 1 exceeds the dehumidification capacity of the dehumidifying rotor 7, even if the amount of treated air increases, it is not possible to lower the dew point temperature in the work area.

The rotational frequency of the supply fan 2 is adjusted based on the function of the supply fan 2, whereby it is possible to control the dehumidification capacity of the dehumidifying device for dew point temperature adjustment 1 and adjust the dew point temperature and the supply amount of the treated air that is supplied to the work area. In this way, it is possible to stabilize the dew point temperature in the work area to an aimed value.

Second Functional Unit

The dehumidifying rotor 7, which is the second functional unit, is a structure in which a dehumidifying agent is disposed, and is divided into the treatment zone 8, the precooling zone 9, and the regeneration zone 10. The dehumidifying rotor 7 rotates at a speed controlled by a geared motor 11.

A typical structure of the dehumidifying rotor 7 has a honeycomb shape. However, any structure may be used as long as it can efficiently adsorb the moisture in the air and desorb the moisture.

Further, as the dehumidifying agent, any dehumidifying agent may be used as long as it can adsorb and desorb moisture. For example, a dehumidifying agent having a high hygroscopic property, such as silica gel or zeolite, can be given.

The blow-out air volume adjustment damper 17 for distributing the treated air that is supplied to the work area through a supply path 13 is installed at the rear stage of the treatment zone 8 of the dehumidifying rotor 7.

The regeneration heater 14 is installed between the precooling zone 9 and the regeneration zone 10 of the dehumidifying rotor 7. Further, a temperature sensor 15 and a temperature sensor 16 are installed before and after the regeneration zone 10.

In the treatment zone 8 of the dehumidifying rotor 7, the moisture of the air sent from the supply fan 2 is adsorbed and dehumidified. If necessary, the dehumidified air is heated to a predetermined temperature by a control heater 12 according to the temperature measured by the temperature sensor 6.

The dehumidified dry air sent to the treatment zone 8 of the dehumidifying rotor 7 may be treated by an optional air filter. In this way, it is possible to remove the dehumidifying agent that has fallen off from the dehumidifying rotor 7, and to supply purified air.

The air sent to the precooling zone 9 of the dehumidifying rotor 7 is heated by the regeneration heater 14 and sent to the regeneration zone 10 as the regeneration air of the dehumidifying rotor 7. In this way, the air heated by the regeneration heater 14 absorbs and desorbs the moisture adsorbed in the treatment zone 8 of the dehumidifying rotor 7, whereby the moisture adsorption ability of the dehumidifying rotor 7 is regenerated. The temperature of the air before and after passes through the regeneration zone is measured by the temperature sensor 15 and the temperature sensor 16 to manage the regeneration efficiency.

Next, the function of the dehumidifying rotor 7, which is the second functional unit, in the dehumidification capacity of the dehumidifying device for dew point temperature adjustment 1 will be described.

In a case where the rotating speed of the dehumidifying rotor 7, which is the second functional unit, is increased, the regeneration of the moisture adsorption ability in the regeneration zone 10 decreases. At this time, in a case where a condition such as the amount or the quality of the air that is supplied to the dehumidifying rotor 7 is constant, the dehumidification efficiency with respect to air is lowered and the dew point temperature of the treated air that is supplied to the work area rises. On the contrary, in a case where the rotating speed of the dehumidifying rotor 7 decreases, the dehumidification efficiency with respect to air rises and the dew point temperature of the treated air that is supplied to the work area is lowered.

The rotating speed of the dehumidifying rotor 7 is adjusted based on the function of the dehumidifying rotor 7, whereby it is possible to control the dehumidification capacity of the dehumidifying device for dew point temperature adjustment land adjust the dewpoint temperature of the treated air that is supplied to the work area. In this way, it is possible to stabilize the dew point temperature in the work area to an aimed value.

Third Functional Unit

The dehumidifying device for dew point temperature adjustment 1 is provided with the blow-out air volume adjustment damper 17 which is the third functional unit for discharging the dehumidified air at the end point of the supply path 13.

The air dehumidified in the treatment zone 8 of the dehumidifying rotor 7 and flowing through the supply path 13 is supplied to the work area as the treated air through the blow-out air volume adjustment damper 17 which is the third functional unit. As the work area, a dry room or the like can be given as an example. However, there is no limitation thereto. Further, this work area may be a space where a person performs work or the like, or may be an unmanned space for only a machine or the like.

Next, the function of the blow-out air volume adjustment damper 17, which is the third functional unit, in the dehumidification capacity of the dehumidifying device for dew point temperature adjustment 1 will be described.

Ina case where the opening degree of the blow-out air volume adjustment damper 17, which is the third functional unit, is increased, the amount of the treated air that is supplied to the work area increases. At this time, in a case where a condition such as the amount of introduced air or the rotating speed of the dehumidifying rotor 7 is constant, the amount of the treated air that is supplied to the work area increases, and therefore, the dew point temperature in the work area is lowered. On the contrary, in a case where the opening degree of the blow-out air volume adjustment damper 17 decreases, the amount of the treated air that is supplied to the work area decreases, and therefore, the dew point temperature in the work area rises.

The opening degree of the blow-out air volume adjustment damper 17 is adjusted based on the function of the blow-out air volume adjustment damper 17, whereby it is possible to control the dehumidification capacity of the dehumidifying device for dew point temperature adjustment 1 and adjust the dew point temperature and the supply amount of the treated air that is supplied to the work area. In this way, it is possible to stabilize the dew point temperature in the work area to an aimed value.

Fourth Functional Unit

The dehumidifying device for dew point temperature adjustment 1 is provided with the exhaust fan 18 which is the fourth functional unit for forming the flow of the regeneration air at the outlet of the regeneration zone 10 of the dehumidifying rotor 7.

The flow of the air passing through the regeneration zone 10 from the precooling zone 9 of the dehumidifying rotor 7 is formed by the operation of the exhaust fan 18.

Next, the function of the exhaust fan 18, which is the fourth functional unit, in the dehumidification capacity of the dehumidifying device for dew point temperature adjustment 1 will be described.

In a case where the rotational frequency of the exhaust fan 18, which is the fourth functional unit, is increased, the amount of the regeneration air flowing into the regeneration zone 10 of the dehumidifying rotor 7 increases, and therefore, the regeneration capacity of the dehumidifying rotor 7 is improved. Therefore, in a case where conditions such as the amount of the air that is introduced into the dehumidifying device for dew point temperature adjustment 1, or the amount of the treated air that is supplied to the work area, and the rotating speed of the dehumidifying rotor 7 are constant, the dehumidification efficiency of the dehumidifying rotor 7 with respect to the air rises and the dew point temperature of the treated air that is supplied to the work area decreases sharply. On the contrary, in a case where the rotational frequency of the exhaust fan 18 decreases, the regeneration capacity of the dehumidifying rotor 7 is lowered, and therefore, the dew point temperature of the treated air that is supplied to the work area rises sharply.

The rotational frequency of the exhaust fan 18 is adjusted based on the function of the exhaust fan 18, whereby it is possible to control the dehumidification capacity of the dehumidifying device for dew point temperature adjustment 1 and adjust the dew point temperature and the supply amount of the treated air that is supplied to the work area. In this way, it is possible to stabilize the dew point temperature in the work area to an aimed value.

Fifth Functional Unit

The dehumidifying device for dew point temperature adjustment 1 is provided with the exhaust air volume adjustment damper 19 which is the fifth functional unit for discharging the regeneration air sent from the exhaust fan 18.

The regeneration air that is sent from the exhaust fan 18 is exhausted to the outside of the dehumidifying device for dew point temperature adjustment 1 through the exhaust air volume adjustment damper 19 which is the fifth functional unit.

Next, the function of the exhaust air volume adjustment damper 19, which is the fifth functional unit, in the dehumidification capacity of the dehumidifying device for dew point temperature adjustment 1 will be described.

Ina case where the opening degree of the exhaust air volume adjustment damper 19, which is the fifth functional unit, is increased, the amount of the regeneration air flowing into the regeneration zone 10 of the dehumidifying rotor 7 increases, and therefore, the regeneration capacity of the dehumidifying rotor 7 is improved. Therefore, in a case where conditions such as the amount of the air that is introduced into the dehumidifying device for dew point temperature adjustment 1, or the amount of the treated air that is supplied to the work area, and the rotating speed of the dehumidifying rotor 7 are constant, the dehumidification efficiency of the dehumidifying rotor 7 with respect to the air rises and the dew point temperature of the treated air that is supplied to the work area decreases sharply. On the contrary, in a case where the opening degree of the exhaust air volume adjustment damper 19 decreases, the dew point temperature of the treated air that is supplied to the work area rises.

The opening degree of the exhaust air volume adjustment damper 19 is adjusted based on the function of the exhaust air volume adjustment damper 19, whereby it is possible to control the dehumidification capacity of the dehumidifying device for dew point temperature adjustment 1 and adjust the dew point temperature and the supply amount of the treated air that is supplied to the work area. In this way, it is possible to stabilize the dew point temperature in the work area to an aimed value.

The adjustment of the dew point temperature of the treated air that is supplied to the work area by the features of the first to fifth functional units will be described.

The air introduced into the dehumidifying device for dew point temperature adjustment 1 by the driving operation of the supply fan 2 is dehumidified by the dehumidifying rotor 7 and exhausted from the blow-out air volume adjustment damper 17 as the treated air that is supplied from the dehumidifying device for dew point temperature adjustment 1 to the work area. By the driving operation of the blow-out air volume adjustment damper 17, some of the air dehumidified by the dehumidifying rotor 7 is dehumidified again by the dehumidifying rotor 7. Further, the moisture adsorption ability of the dehumidifying rotor 7 is regenerated by the driving operations of the exhaust fan 18 and the exhaust air volume adjustment damper 19.

Therefore, the dehumidification capacity of the dehumidifying device for dew point temperature adjustment 1 can be adjusted by controlling the driving operations of the first to fifth functional units.

Test Example

The dehumidifying device for dew point temperature adjustment 1 has the configuration as described above. The contribution ratio of each configuration to the dehumidifying function of the dehumidifying device for dew point temperature adjustment 1 was investigated. The contribution ratio is an evaluation of the magnitude of the fluctuation amount of the dew point temperature when only the control parameters of the functional units fluctuate. As for the fluctuation of the control parameter, the fluctuations at the time of the maximum output and the time of the minimum output of the functional unit as a device were evaluated. As a result, it was clarified that the driving operations of the rotational frequency of the supply fan 2 which is the first functional unit, the rotating speed of the dehumidifying rotor 7 which is the second functional unit, the opening degree of the blow-out air volume adjustment damper 17 which is the third functional unit, the rotational frequency of the exhaust fan 18 which is the fourth functional unit, and the opening degree of the exhaust air volume adjustment damper 19 which is the fifth functional unit greatly affect the dehumidifying function of the dehumidifying device for dew point temperature adjustment 1. Specifically, by controlling the driving operations such that the rotational frequency of the supply fan 2 is within the range of 30 to 60 rotations/minute, the rotational frequency of the exhaust fan 18 is within the range of 10 to 60 rotations/minute, the rotating speed of the dehumidifying rotor 7 is within the range of 15 to 60 rotations/hour, the opening degree of the blow-out air volume adjustment damper 17 is within the range of 50 to 100%, and the opening degree of the exhaust air volume adjustment damper 19 is within the range of 30 to 100%, it was possible to effectively adjust the dehumidifying function of the dehumidifying device for dew point temperature adjustment 1 and stably maintain the dew point temperature at an optional dew point temperature. Specifically, in the dew point temperature of −20° C. or lower, it was possible to adjust the dew point temperature to the range of ±5° C. with respect to a setting value of an optional dew point temperature. Further, also in the dew point temperature of −30° C. or lower, it was possible to adjust the dew point temperature to the range of ±5° C. with respect to a setting value of an optional dew point temperature.

With respect to driving operations of other parts including the regeneration heater 14, the influence on the dehumidifying function of the dehumidifying device for dew point temperature adjustment 1 was small, or there was no influence. Further, a driving operation of a part having a small influence on the dehumidifying function may be used for fine adjustment of the dehumidifying function of the dehumidifying device for dew point temperature adjustment 1.

With respect to the contribution ratio to the dehumidifying function, the contribution ratios of "the rotational frequency of the exhaust fan 18 which is the fourth functional unit", "the rotating speed of the dehumidifying rotor 7 which is the second functional unit", and "the opening degree of the exhaust air volume adjustment damper 19 which is the fifth functional unit" were relatively large, and the contribution ratios of "the opening degree of the blow-out air volume adjustment damper 17 which is the third functional unit" and "the rotational frequency of the supply fan 2 which is the first functional unit" were relatively small. The dew point temperature is controlled by adjusting at least one of the functional units. At that time, the dew point temperature may be controlled by adjusting a plurality of functional units, and in particular, it is preferable that the dew point temperature is controlled by adjusting one or more of "the rotational frequency of the exhaust fan 18 which is the fourth functional unit", "the rotating speed of the dehumidifying rotor 7 which is the second functional unit", and "the opening degree of the exhaust air volume adjustment damper 19 which is the fifth functional unit", which have a relatively large contribution ratio. Further, it is preferable that the dew point temperature is controlled by combination of one or more of "the rotational frequency of the exhaust fan 18 which is the fourth functional unit", "the rotating speed of the dehumidifying rotor 7 which is the second functional unit", and "the opening degree of the exhaust air volume adjustment damper 19 which is the fifth functional unit", which are the functional units having a relatively large contribution ratio, and one or more of "the opening degree of the blow-out air volume adjustment damper 17 which is the third functional unit" and "the rotational frequency of the supply fan 2 which is the first functional unit", which are the functional units having a relatively small contribution ratio.

As described above, in the dehumidifying device for dew point temperature adjustment 1, by optimizing the rotational frequency of the supply fan, the rotational frequency of the exhaust fan, the rotating speed of the dehumidifying rotor, the opening degree of the blow-out air volume adjustment damper, and the opening degree of the exhaust air volume adjustment damper according to the setting value of the dew point temperature, it is possible to stably supply air having an aimed dew point temperature.

The dehumidifying device for dew point temperature adjustment 1 according to one embodiment of the present invention has a controller. The controller 20 communicates with a humidity sensor 21 that detects the humidity of the treated air that is supplied to the work area, an adjuster portion 22 of the supply fan 2, an adjuster portion 23 of the dehumidifying rotor 7, an adjuster portion 24 of the blow-out air volume adjustment damper 17, and an adjuster portion 25 of the exhaust fan 18, and an adjuster portion 26 of the exhaust air volume adjustment damper 19. The communication may be performed by direct connection by a wire or the like, or may be performed by indirect connection through a communication technology such as wireless communication.

In FIG. 2, the humidity sensor 21 is installed outside the dehumidifying device for dew point temperature adjustment 1. However, it may be provided at any position of the supply path 13 inside the device as long as it can measure the humidity of the air heated by the control heater 12. Further, the humidity sensor 21 may be replaced with a dew point temperature sensor, if necessary.

The controller 20 has a built-in control program that determines the dehumidification efficiency of the dehumidifying device for dew point temperature adjustment 1 with respect to the setting value of the dew point temperature, based on the measurement result of the humidity sensor 21 that detects the humidity of the treated air that is supplied to the work area, and controls the driving operations of the supply fan 2, the dehumidifying rotor 7, the blow-out air volume adjustment damper 17, the exhaust fan 18, and the exhaust air volume adjustment damper 19.

The control program includes a motion control algorithm that calculates the contribution ratio of each of the supply fan 2, the dehumidifying rotor 7, the blow-out air volume adjustment damper 17, the exhaust fan 18, and the exhaust air volume adjustment damper 19 to the setting value of an optional dew point temperature from an actual measurement value and optimizes each driving operation. The motion control algorithm can be designed, for example, based on an advance performance test related to the dehumidifying device for dew point temperature adjustment 1.

The controller 20 calculates the rotational frequency of the supply fan 2, the rotating speed of the dehumidifying rotor 7, the opening degree of the blow-out air volume adjustment damper 17, the rotational frequency of the exhaust fan 18, and the opening degree of the exhaust air volume adjustment damper 19 from the humidity of the treated air that is supplied to the work area, detected by the humidity sensor 21, and the set dew point temperature. The instructions on the optimum driving operations of the supply fan 2, the dehumidifying rotor 7, the blow-out air volume adjustment damper 17, the exhaust fan 18, and the exhaust air volume adjustment damper 19 are given to the adjuster portion 22 of the supply fan 2, the adjuster portion 23 of the dehumidifying rotor 7, the adjuster portion 24 of the blow-out air volume adjustment damper 17, the adjuster portion 25 of the exhaust fan 18, and the adjuster portion 26 of the exhaust air volume adjustment damper 19, based on the calculation results, such that a dew point temperature in the range of ±5° C. of the set dew point temperature is obtained.

Regarding the driving operations, for example, the rotational frequency of the supply fan 2 is controlled in the range of 30 to 60 rotations/minute, the rotating speed of the dehumidifying rotor 7 is controlled in the range of 15 to 60 rotations/hour, the opening degree of the blow-out air volume adjustment damper 17 is controlled in the range of 50 to 100%, the rotational frequency of the exhaust fan 18 is controlled in the range of 10 to 60 rotations/minute, and the opening degree of the exhaust air volume adjustment damper 19 is controlled in the range of 30 to 100%.

As the control range of the driving operation of each of the supply fan 2, the dehumidifying rotor 7, the blow-out air volume adjustment damper 17, the exhaust fan 18, and the exhaust air volume adjustment damper 19, any control range may be adopted as long as it makes it possible to obtain the dew point temperature that is set according to the performance of the dehumidifying device for dew point temperature adjustment 1, and there is no limitation thereto.

Further, the dehumidifying device for dew point temperature adjustment 1 may be provided with a humidity sensor 27 for measuring the humidity of the outside air or the treatment air that is sucked, and the humidity sensor 27 may be directly or indirectly connected to the controller 20. The humidity sensor 27 transmits information on the humidity of the air that is sucked to the controller 20. The controller 20 calculates the driving operations of the supply fan 2, the dehumidifying rotor 7, the blow-out air volume adjustment damper 17, the exhaust fan 18, and the exhaust air volume adjustment damper 19 such that the dew point temperature can be quickly adjusted according to the humidity of the air that is sucked, and sends an instruction to each adjuster portion. In this way, improvement of the dew point temperature adjusting function of the dehumidifying device for dew point temperature adjustment 1 can be expected.

In FIG. 2, the humidity sensor 27 is installed outside the dehumidifying device for dew point temperature adjustment 1. However, it may be provided at any position from the damper 3 inside the device to the cooling coil 4 as long as it can measure the quality of the treatment air that is sucked. Further, the humidity sensor 27 may be replaced with a temperature and humidity sensor, if necessary.

As described above, the dehumidifying device for dew point temperature adjustment according to the present invention can control the driving operations of the supply fan, the dehumidifying rotor, the blow-out air volume adjustment damper, the exhaust fan, and the exhaust air volume adjustment damper according to the setting value of the dew point temperature and the humidity of the air that is discharged, by the controller having a control program, to adjust the dew point temperature. Further, the control program may have a timer function such as executing various dew point temperatures set for each time zone. The control of all these driving operations may be automatically executed by the controller as a control program, or may include manual operations by an operator. From the viewpoint of reducing the labor of the operator, it is more preferable to use automatic control by a control program.

The dehumidifying device for dew point temperature adjustment according to the present invention can be used in order to stably adjust the humidity in the work area to an aimed optional dew point temperature. Specifically, it can be used in a dry room in order to maintain an aimed humidity condition.

Further, the dehumidifying device for dew point temperature adjustment according to the present invention can reduce the labor of an operator by automatic control by a control program. Further, unnecessary power consumption can be reduced by an optimized control program.

It should be understood that the invention is not limited to the above-described embodiment, but may be modified into various forms on the basis of the spirit of the invention. Additionally, the modifications are included in the scope of the invention.

What is claimed is:

1. A dehumidifying device for dew point temperature adjustment that adjusts a dew point temperature of air to a temperature of about −20° C. or lower, the device comprising:
an adjuster portion that adjusts the dew point temperature by adjusting at least one driving operation that is selected from a rotational frequency of a supply fan inside the dehumidifying device for dew point temperature adjustment for introducing air into the dehumidifying device for dew point temperature adjustment by an adjuster of the supply fan, a rotating speed of a dehumidifying rotor by an adjuster of a dehumidifying rotor, an opening degree of a blow-out air volume adjustment damper by an adjuster of a blow-out air volume adjustment damper, a rotational frequency of an exhaust fan for exhausting air by an adjuster of an exhaust fan, an opening degree of an exhaust air volume adjustment damper by an adjuster of an exhaust air volume adjustment damper, and a temperature of a regeneration heater, wherein
the adjuster portion adjusts the dew point temperature according to a contribution ratio to a dehumidifying function,
the adjuster portion performs
a first control that adjusts the dew point temperature by adjusting at least one of the rotational frequency of the exhaust fan, the rotating speed of the dehumidifying rotor, and the opening degree of the exhaust air volume adjustment damper, and
a second control that adjusts the dew point temperature by adjusting at least one of the opening degree of the blow-out air volume adjustment damper and the rotational frequency of the supply fan,
a contribution ratio of the first control is larger than a contribution ratio of the second control, and
the adjuster portion performs the second control for fine adjustment of the dehumidifying function.

2. The dehumidifying device for dew point temperature adjustment according to claim 1, wherein the dew point temperature is adjusted to a temperature in a range of about ±5° C. with respect to a setting value.

3. The dehumidifying device for dew point temperature adjustment according to claim 1, wherein the adjuster portion is a controller.

4. The dehumidifying device for dew point temperature adjustment according to claim 1, wherein a cooling coil is disposed between a damper which is a suction unit for an outside air and a treatment air and the supply fan, and temperature sensors are disposed before and after the cooling coil.

5. The dehumidifying device for dew point temperature adjustment according to claim 1, wherein
the dehumidifying rotor carries a dehumidifying agent and has a substantially circular shape,
the blow-out air volume adjustment damper distributes a dehumidified air,
the exhaust fan forms a flow of a regeneration air at an outlet of the dehumidifying rotor, and
the exhaust air volume adjustment damper discharges the regeneration air sent from the exhaust fan.

6. The dehumidifying device for dew point temperature adjustment according to claim 5, wherein the dehumidifying rotor is divided into a treatment zone, a precooling zone, and a regeneration zone, and
the dehumidifying rotor rotates at a speed controlled by a geared motor.

7. The dehumidifying device for dew point temperature adjustment according to claim 6, wherein a regeneration heater is disposed between the precooling zone and the regeneration zone, and
temperature sensors are disposed before and after the regeneration zone.

8. The dehumidifying device for dew point temperature adjustment according to claim 7, wherein the blow-out air volume adjustment damper is disposed at a rear stage of the treatment zone.

9. A method of using a dehumidifying device for dew point temperature adjustment that adjusts a dew point temperature of air to a temperature of about −20° C. or lower, the method comprising:
adjusting at least one driving operation that is selected from a rotational frequency of a supply fan inside the dehumidifying device for dew point temperature adjustment for introducing air into the dehumidifying device for dew point temperature adjustment, a rotating speed of a dehumidifying rotor, an opening degree of a blow-out air volume adjustment damper, a rotational frequency of an exhaust fan for exhausting air, an opening degree of an exhaust air volume adjustment damper, and a temperature of a regeneration heater;
adjusting the dew point temperature according to a contribution ratio to a dehumidifying function; and
Performing
a first control that adjusts the dew point temperature by adjusting at least one of the rotational frequency of the exhaust fan, the rotating speed of the dehumidifying rotor, and the opening degree of the exhaust air volume adjustment damper, and
a second control that adjusts the dew point temperature by adjusting at least one of the opening degree of the blow-out air volume adjustment damper and the rotational frequency of the supply fan,
wherein a contribution ratio of the first control is larger than a contribution ratio of the second control, and
the second control is performed for fine adjustment of the dehumidifying function.

* * * * *